United States Patent [19]

Rama, Jr.

[11] Patent Number: 5,505,849

[45] Date of Patent: Apr. 9, 1996

[54] FILTERING APPARATUS

[76] Inventor: Roman Rama, Jr., 2113 74th St., Galveston, Tex. 77551

[21] Appl. No.: 368,279

[22] Filed: Jan. 3, 1995

Related U.S. Application Data

[63] Continuation-in-part of Ser. No. 130,741, Oct. 4, 1993, abandoned.

[51] Int. Cl.$^6$ ................................... B01D 35/027
[52] U.S. Cl. ................ 210/232; 210/495; 210/497.01; 210/499; 210/172
[58] Field of Search ................................... 210/172, 452, 210/459–463, 477, 478, 495, 232, 244, 497.01, 497.3, 499, 348; 220/88.2

[56] References Cited

U.S. PATENT DOCUMENTS 2,733,775  2/1956  Dupure ................................... 210/460
4,204,966  3/1980  Morgan, Jr. ............................. 210/452

*Primary Examiner*—Matthew O. Savage
*Attorney, Agent, or Firm*—Bill B. Berryhill

[57] ABSTRACT

Apparatus for filtering particulates from fuel being transferred through a nozzle into a fuel tank including an annular flange member and an elongated tubular mesh filter member having a proximal end of which is attached to the flange member, providing an opening through which a fuel nozzle may be inserted into the filter member, and a distal end which is closed so that particulates of predetermined size are prevented from flowing through the tubular filter member. The tubular filter member is provided, near the proximal end thereof, with a radially outwardly projecting protuberance, permitting insertion or removal of the apparatus into or from a tank only upon contraction of the tubular filter member.

3 Claims, 1 Drawing Sheet

10
FILTERING APPARATUS

CROSS REFERENCE TO RELATED APPLICATION

The present application is a continuation-in-part of U.S. patent application Ser. No. 08/130,741, filed Oct. 4, 1993, now abandoned.

BACKGROUND OF THE INVENTION

1. Field of the Invention

The present invention pertains to filter apparatus. More specifically, the present invention pertains too apparatus for filtering particulates from liquid fuels such as diesel and gasoline.

2. Description of the Prior Art

It is, of course, important that liquid fuel operated engines receive fuel as nearly free of impurities as practical. This is particularly true of solid impurities or particulates which may clog fuel lines, carburetors or other engine components. While most fuel operated engines are provided with some type of filter, it is most important that the fuel tank from which the engine receives fuel be filled with unadulterated fuel. To this end, various fuel filters have been provided. Examples of recent developments in the art may be seen in U.S. Pat. Nos. 4,851,118 and 4,908,130. While such filters have solved some of the problems associated with filtering of fuel, most of them are relatively complex and once installed may not be easily removed. Thus, they may not be suitable for easy cleaning and/or for temporary placement in a fuel storage tank so that they may be removed for use with other tanks.

SUMMARY OF THE PRESENT INVENTION

The present invention provides apparatus for filtering particulates from fuel being transferred through a nozzle into a fuel tank and may be suitable for use with gasoline, diesel or other fuels. It may be utilized with truck and automobile gasoline or diesel tanks or simply with tanks in which such fuels may be stored.

The filtering apparatus of the present invention is simple in construction, comprising an annular flange member to which is attached an elongated tubular mesh filter member. The proximal end of the filter member is attached to the flange member and provides an opening through which a fuel filling nozzle may be inserted. The distal end of the tubular mesh filter member is closed so that particulates of predetermined size are prevented from flowing through the tubular filter member into the tank. The unique simple design of the filtering apparatus of the present invention allows easy insertion of the filter apparatus through the filler aperture of almost any fuel tank. It does not require special installation and may be easily inserted and/or removed by almost anyone.

The unique construction of the filter apparatus of the present invention provides a protuberance on the tubular mesh filter which extends radially to such an extent as to require radial contraction of the tubular mesh member for installation or removal of the filtering apparatus through the fuel tank filler aperture. However, the diameter of the tubular mesh member is such that when the fuel filler nozzle is inserted thereinto, the tubular mesh member may not be sufficiently contracted to allow removal of the filtering apparatus while the nozzle is still inserted thereinto. This prevents premature dislodgement of the filtering apparatus, especially as the nozzle is being removed therefrom. If not for the unique protuberant design, the filter apparatus might be accidently removed upon removal of the nozzle. This could cause the filter apparatus to fall on the ground or another location where it would be contaminated.

Once the fuel nozzle has been removed from the filtering apparatus, the filtering apparatus can then be removed from the fuel tank by contraction of the tubular mesh member. The filter can then be transferred to another tank if desired. This is particularly desirable for use with tank trucks in which the truck may be moved from place to place to replenish fuel stored in storage tanks or for use at a location where large construction vehicles are refueled so that the filter may be used in filtering fuel being transferred into tanks of the construction vehicles.

Thus the filtering apparatus of the present invention is simple in construction and use yet very effective in filtering particulates from liquid fuel such as gasoline and diesel. It may be easily removed for cleaning or use at different locations. It may be easily manufactured and provided at low cost. Many other objects and advantages of the invention will be apparent from reading the description which follows in conjunction with the accompanying drawings.

DESCRIPTION OF A PREFERRED EMBODIMENT OF THE INVENTION

Figure 1:
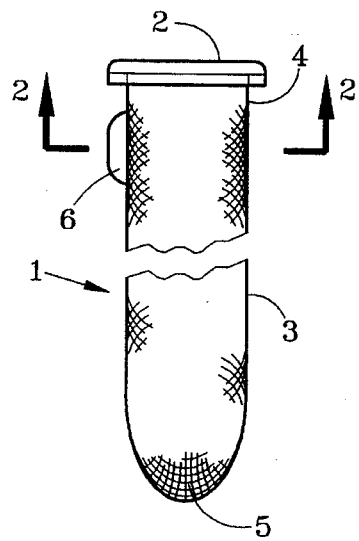
FIG. 1 is a longitudinal view of the filter apparatus of the present invention, according to a preferred embodiment thereof.
Figure 2:
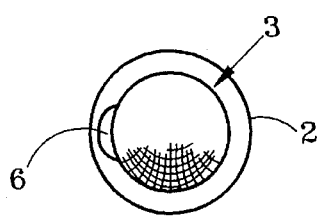
FIG. 2 is a cross-sectional view of the filtering apparatus of FIG. 1, taken along lines 2—2 thereof.

Referring first to FIGS. 1 and 2, the filtering apparatus of the present invention 1 comprises an annular flange member 2 and an elongated tubular filter member 3. The annular flange member 2 may be made from any rigid material and preferably of a material which would not create sparks, i.e. brass, plastic, etc. The outside diameter of the flange member 2 should be greater than the diameter of any filler aperture of the fuel tank with which the filtering apparatus is to be used. Of course the inside diameter of the flange member 2 should be greater than the outside diameter of any filler nozzle which would be used therewith so as to allow insertion of the nozzle through the flange opening.

The elongated tubular filter member 3 has a proximal end 4 which is attached to the flange member 2 in any suitable manner, providing an opening through which a filler nozzle may be inserted into the filter. The distal end 5 of the filter member 3 is closed. The filter member 3 is made of any suitable mesh material, cloth, plastic, wire, etc. providing perforations through which fuel may flow but being of small size so that particulates of predetermined size are prevented from flowing through the filter member 3.

The tubular filter member 3 is also provided, near the proximal end thereof, with a radially, outwardly projecting protuberance 6. The radial distance from a central axis of the tubular filter member 3 to the outermost portion of protuberance 6 should be greater than the radius of any filler aperture with which the filtering device 1 is to be used. However, since the filter member 3 is of a mesh material, it may, if not inwardly restrained, be contracted so as to allow insertion of the filter member 3 through a filler aperture to allow the protuberance 6 to pass therethrough. To aid in contraction of the tubular member 3 the protuberance 6 is longitudinally and transversely tapered toward its edges.

Figure 3:
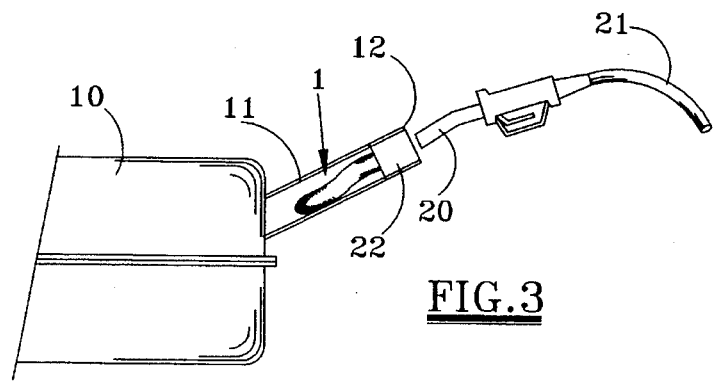
FIG. 3 is a pictorial representation of an automobile fuel tank and a filler nozzle being used to fill the tank, the filler neck of the automobile fuel tank being provided with filtering apparatus, such as that of FIGS. 1 and 2, according to a preferred embodiment of the invention.
Figure 4:
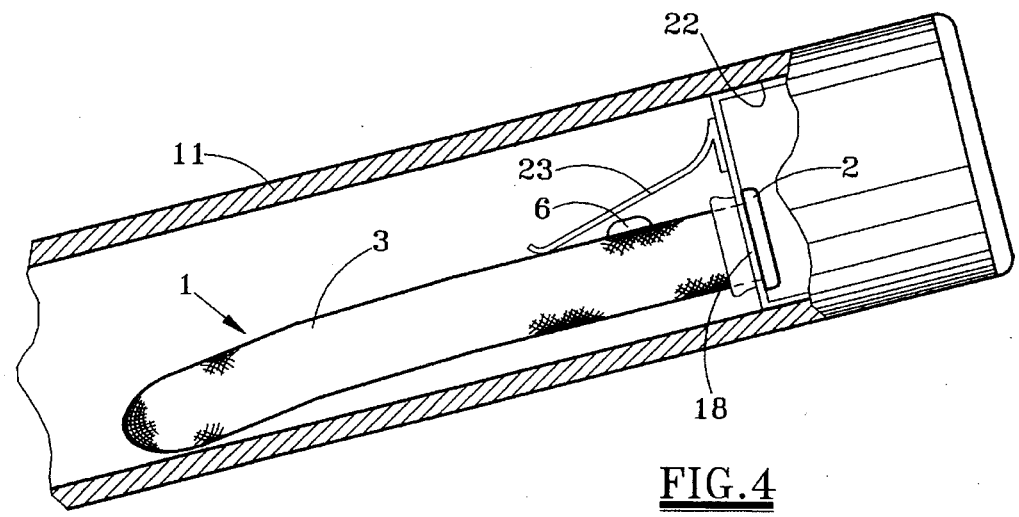
FIG. 4 is an enlarged longitudinal view of an automobile fuel tank filler neck, partially in section, utilizing filtering apparatus of the present invention, according to a preferred embodiment thereof.

Referring now to FIGS. 3 & 4, there is shown an automobile fuel tank 10 having a filler neck 11 at the upper end of which is a filler aperture 12 surrounded by some type of annular surface. In present day automobiles, this annular surface may be provided in a cylindrical sleeve 22 having a filler aperture 18 size to prevent insertion of larger filler nozzles. In FIG. 3, a filler nozzle 20 is connected by a hose 21 to a fuel pump (not shown). In these type of devices a leaf-type check valve may also be provided. See also FIG. 4.

As indicated in FIGS. 3 and 4, the filter 1 is installed simply by inserting the tubular member 3 through the aperture 18 until the flange member 2 rests against an annular surface around the aperture 18. Upon insertion, the protuberance 6 passes through the aperture 18 only upon contraction of the tubular mesh member 3. Likewise, to remove the filter apparatus 1, enough axial force must be placed on the filter apparatus 3 to cause the mesh to radially contract allowing protuberance 6 to pass through the aperture 18.

Once the filter apparatus 1 is in place, a nozzle 20 may be inserted through the flange 2 and into the tubular filter member 3. Fuel may be then dispensed through nozzle 20, flowing through the perforations of the tubular mesh 3 and through the filler neck 11 into the tank 10. Solid particulates of previously determined size are filtered by the mesh material of the tubular filter member 3 and prevented from entering the tank 10. Of course, to allow insertion of the nozzle 20 into the tubular member 3, the diameter of the tubular filter member 3 is slightly greater than the diameter of the nozzle. Because of the relative fit between the nozzle and the mesh member 3, the mesh member 3 may not be contracted as long as the nozzle is inserted thereinto. Thus the nozzle is prevented from accidental removal since the protuberance 6 will not allow removal of the tubular member 3 unless the mesh thereof may be contracted.

Figure 5:
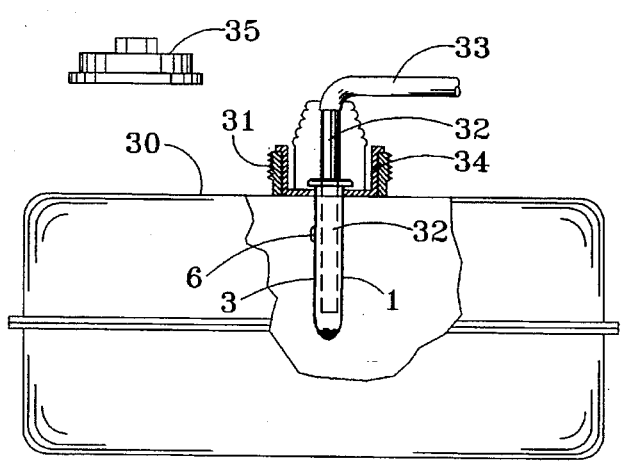
FIG. 5 is a pictorial representation of a stationary fuel tank being filled with fuel and equipped with filtering apparatus of the present invention.

FIG. 5 simply illustrates use of filtering apparatus 1 of the present invention with a stationary fuel tank 30 which has a filler neck or aperture 31. The filter apparatus 1 is shown inserted into the tank 30 which is being filled through a nozzle 32 and hose 33. The filler neck 31 might be provided with an adapter or insert 34, similar to the sleeve 22 of FIG. 4, which would allow use of a vapor recovery type nozzle. Of course, the tank would also be provided with a cap or cover 35 closing the filler neck 31 after filling of the tank 30 with fuel. The tubular filter member 3 would be inserted through an aperture provided in adapter 34. The nozzle 32 is of such a diameter as to permit insertion into the tubular filter member 3 and when in place prevents contraction of filter member 3 so that the protuberance 6 prevents accidental dislodgement of filtering apparatus 1 therefrom.

Thus, the filtering apparatus of the present invention provides an easy, effective way of filtering particulates, of predetermined size, from fuel being dispensed into a fuel tank. The apparatus is extremely simple in construction and use.

Although a single embodiment of the invention has been described herein, many variations may be made without departing from the spirit of the invention. It is intended that the scope of the invention be limited only by the claims which follow.

I claim:

1. Filter apparatus for filtering particulates from fuel being transferred through a nozzle into a fuel tank provided with a filler aperture, said filter apparatus comprising:

an annular flange member the outside diameter of which is greater than the diameter of said filler aperture with which said filter apparatus may be used, wherein said annular flange member includes a central opening therethrough;

an elongated radially contractible tubular mesh filter member including a central axis, said filter member having an open proximal end of which is attached to the central opening of said flange member whereby a fuel nozzle may be inserted into said filter member, wherein said filter member includes a distal end which is closed so that particulates of predetermined size may be prevented from flowing through said tubular mesh filter member, the outside diameter of said tubular mesh filter member being less than the outside diameter of said flange member permitting said filter member to be selectively inserted into and removed from a fuel tank through said filler aperture; and a radially outwardly projecting protuberance, said protuberance being axially spaced from said annular flange member and attached to an outer surface of said tubular mesh filter member, wherein an annular portion of said elongated radially contractible tubular mesh filter member axially separates said flange member from said protuberance, wherein a radial distance from the central axis of said tubular mesh filter member to the outermost portions of said protuberance is greater than the radius of said filler aperture with which said filter apparatus may be used, permitting insertion or removal of said apparatus into or from a fuel tank only upon contraction of said tubular mesh filter member as said protuberance may be forced through a fuel tank filler aperture.

2. Filter apparatus as set forth in claim 1 whereby the diameter of said tubular mesh filter member is greater than the diameter of said nozzle allowing said nozzle to be inserted thereinto when said filter member is in said fuel tank, the nozzle then preventing substantial contraction of said tubular mesh filter member and preventing removal of said filter apparatus from the fuel tank until the nozzle is removed therefrom.

3. Filter apparatus as set forth in claim 1 in which outer edges of said protuberance are tapered to facilitate contraction of said tubular mesh filter member upon forcing of said protuberance through said filler aperture.

\* \* \* \* \*